Aug. 25, 1942.   J. W. SMITH   2,294,136
DIP ATTACHMENT FOR MINNOW BUCKETS
Filed April 10, 1941
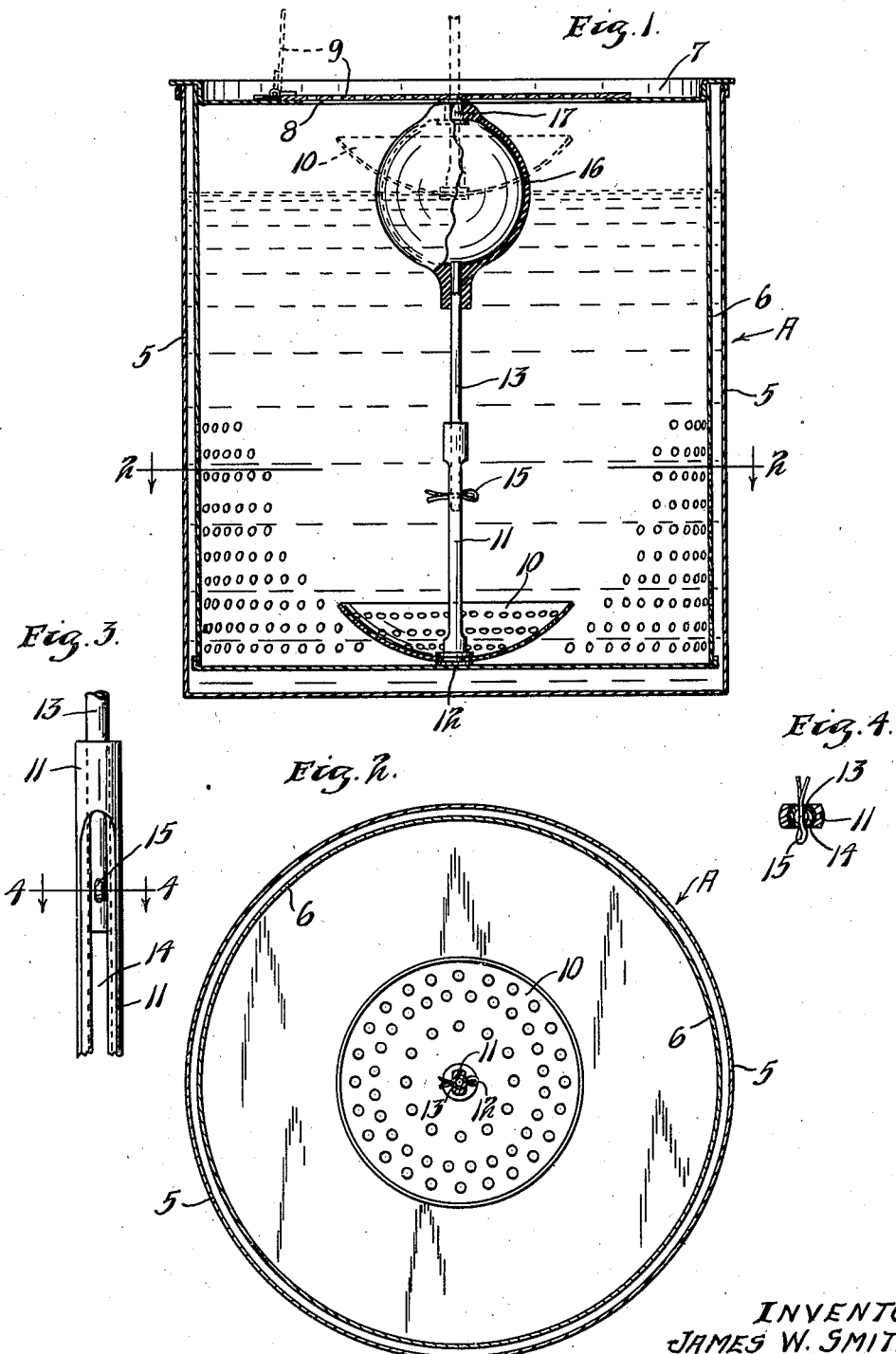
INVENTOR
JAMES W. SMITH.
BY HIS ATTORNEYS.
Williamson & Williamson Patented Aug. 25, 1942

2,294,136

UNITED STATES PATENT OFFICE 2,294,136

DIP ATTACHMENT FOR MINNOW BUCKETS

James W. Smith, Minneapolis, Minn.

Application April 10, 1941, Serial No. 387,843

8 Claims. (Cl. 43—56)

This invention relates to improvements in bait buckets and more particularly to accessories for said buckets.

Buckets used for holding fishing bait such as minnows are usually constructed with removable inner members which are reticulated so that the minnows can be lifted from the water in the bait bucket for a brief period while the water is changed. Frequent changes of water are usually necessary to sustain the life of the minnows. It is also customary to use a perforated dipper to dip individual minnows from the water in the bucket when a new bait is desired.

It is an object of my invention to provide a combined dipper and aerator for minnow buckets wherein the aerator is in the form of a buoyant collapsible bulb and is connected to the shank of a dipper to maintain the dipper in a handy position for convenient manipulation.

It is a further object of the invention to provide a dipper and/or aerator which is capable of being placed completely within the bucket with the top closed wherein the upper portion of the dipper extends above the water level so that it can be readily grasped.

These and other objects and advantages of the invention will more fully appear from the following description made in connection with the accompanying drawing, wherein like reference characters refer to the same parts throughout the views, and, in which:

Fig. 1 is a vertical sectional view through a minnow bucket showing my improved structure partially in section and partially broken away;

Fig. 2 is a section taken approximately on the line 2—2 of Fig. 1;

Fig. 3 is an enlarged fragmentary view of the dipper shank; and

Fig. 4 is a section taken approximately on the line 4—4 of Fig. 3.

The drawing shows a minnow bucket A having an outer bucket portion 5 which is adapted to hold water, the water being indicated in Fig. 1. A reticulated inner member 6 is generally provided to permit all of the minnows to be lifted from the bucket when the water supply is changed. The bucket has a top 7 which is ordinarily removable, and the top is provided with a relatively large central opening 8 normally closed by a hinged apertured closure 9.

There is also shown a dipper head 10 which is resting upon the bottom of the inner bucket member 6, said dipper head being preferably perforated as shown to facilitate the dipping of minnows from the water. The dipper head 10 is secured to a lower shank section 11 which extends through the lower central portion of said dipper head 10 and which is clamped to said head by means of flanges 12 which may be formed in any suitable manner. The shank of the dipper also includes an upper tubular section 13 which is telescoped to the lower section 11. Said lower section 11 has a pair of opposed slots 14 and the lower end of the upper section 13 has a pin or cotter key 15 extending therethrough and also through the opposed slots 14. The slots 14 extend substantially throughout the length of the lower shank section 11, thus permitting a considerable degree of telescoping movement of the upper shank section 13 in the lower section 11.

A collapsible bulb 16, preferably of rubber, is shown mounted upon the upper end of the upper tubular shank section 13. Said tubular shank section 13 communicates with the interior of the bulb 16 and the lower end of said section 13 is open to the water in the bucket A. In the upper portion of the collapsible bulb 16 is a check valve 17 which permits air to enter the bulb but prevents it from leaving the bulb through the valve. The details of this valve are not shown since check valves of this type are elements of common knowledge.

It will be seen that when a fisherman desires to remove a minnow from the bucket A he can lift the cover 9 to the dotted line position indicated and grasp the bulb 16, using the same as a handle which is always available since it is buoyant and will remain upon the surface of the water. However, when the top is closed the bulb can be partially submerged by the pressure of the cover 9 so that the dipper structure will not interfere with the cover or require any special cover constructions. It should also be noted that the dipper head 10 and lower shank section 11 are supported by the bottom of the inner bucket members 6 thus relieving the bulb 16 of their weight and making it unnecessary to provide a large bulb.

Additionally it is possible to quickly and easily aerate the water in the minnow bucket by simply squeezing the bulb 16 a few times to add air which is necessary to sustain the life of the minnows. This makes it unnecessary to change the water frequently. The bulb 16, therefore, acts not only as a floating support for the shank or portion thereof, but also as an aerator in combination with the upper shank section 13. Air from the bulb, of course, is forced downwardly through the shank section 13 and out of the bottom end thereof into the water.

It will, of course, be understood that various changes may be made in the form, details, arrangement and proportions of the various parts without departing from the scope of my invention.

What is claimed is:

1. An accessory for bait buckets and the like comprising, a dipper head, a shank having its lower end connected to said head, and a buoyant aerator connected only to the upper end of said shank.

2. An accessory for bait buckets and the like comprising, a dipper head, a shank having upper and lower telescoping sections, the lower section of said shank being connected to said dipper head, and a buoyant aerator connected to the upper section of said shank and free of any connection with any other support.

3. An accessory for bait buckets and the like comprising, a dipper head, a shank having a tubular portion, the lower end of said shank being connected to said dipper head, the tubular portion of said shank being at the top thereof, a collapsible bulb secured to said tubular portion and having a flow connection from its interior to the interior of said tubular shank portion, and a check valve in an upper portion of said collapsible bulb.

4. An accessory for bait buckets and the like comprising, a dipper head, a shank having upper and lower telescoping sections, the lower section of said shank being connected to said dipper head, the upper portion of said shank being tubular, a collapsible bulb mounted on the upper end of said tubular upper section and said tubular section having flow communication with the interior of said bulb, and a check valve in an upper portion of said bulb.

5. An accessory for bait buckets having upper openings with closures therefor comprising, a dipper head, a shank formed from two telescoping sections, one of said sections being secured to said dipper head, a collapsible bulb secured to the other of said telescoping sections, said last mentioned section being tubular and having flow communication with the interior of said bulb, and said telescoping shank sections permitting said dipper head to rest upon the bottom of said bait bucket and also permitting said bulb to float upon liquids placed in said bait bucket and to lie beneath the closure of said bucket.

6. An accessory for bait buckets and the like comprising, a dipper head, a shank composed of a pair of telescoping tubular sections, one of said sections being connected to said dipper head, a collapsible bulb connected to the other of said sections, one of said sections having opposed longitudinal slots extending substantially throughout the length thereof, and the other of said sections having a pin extending transversely therethrough and through the opposed slots of said slotted section.

7. An accessory for bait buckets and the like comprising, a dipper head, a telescoping shank having its lower end connected to said head, and an upper portion of said shank being buoyant and connected to only said lower end, whereby said shank will remain substantially upright in a bait bucket containing water.

8. An accessory for bait buckets and the like comprising, a dipper head, a telescoping shank having its lower end connected to said head, and a buoyant handle connected only to the upper end of said shank.

JAMES W. SMITH.